United States Patent Office 3,370,950
Patented Feb. 27, 1968

3,370,950
PHOTOGRAPHIC STRIPPING FILM
Johan Lodewijk Verelst, Kontich, and Andre Jan Conix, Antwerp, Belgium, assignors to Gevaert Photo-Producten N.V., Mortsel-Antwerp, Belgium, a company of Belgium
No Drawing. Filed Mar. 9, 1964, Ser. No. 350,569
Claims priority, application Netherlands, Mar. 7, 1963, 289,927
11 Claims. (Cl. 96—83)

This invention relates to photographic film and particularly to photographic stripping film comprising a hydrophobic flexible support of polyester.

Photographic stripping film is utilized in making photomontages, in producing stencils for screen printing in a photographic way, and in producing etching resists intended for making photogravure printing plates.

A photographic stripping film substantially consists of a hydrophobic flexible support occasionally bearing at one side an antihalation layer and at the other side successively a stripping layer, a flexible hydrophobic membrane, and a light-sensitive layer.

The stripping layer which adheres the hydrophobic membrane to the hydrophobic support should be of such nature, that during the mechanical cutting operation, the treatment in the photographic baths and further treatments both the membrane and the support are kept firmly bonded, said stripping layer, however, allowing the separation of said membrane and said support from each other after the treatment in photographic baths.

For the production of the hydrophobic flexible support use is made of i.e. cellulose esters such as cellulose triacetate, cellulose acetobutyrate, and cellulose acetopropionate, whereas cellulose nitrate is very often employed for the production of the flexible hydrophobic membrane.

A stripping layer suited for being sandwiched between a hydrophobic flexible membrane and a hydrophobic flexible support, both the membrane and the support being prepared from the afore-mentioned substances, is described in the United States Patent No. 2,638,417 and consists of cellulose nitrate (from 4 to 1 part by weight) and ethyl cellulose (from 6 to 9 parts by weight).

In view of a high dimensional stability there is a trend nowadays towards the use of a stripping film, the hydrophobic flexible support of which consists of polyester. For that purpose, however, stripping layers similar to those used for a stripping film comprising a hydrophobic flexible support of cellulose ester as afore-mentioned cannot be used.

It has now been found that an excellent though not too strong an adhesion between the hydrophobic flexible self-supporting membrane and the hydrophobic flexible polyester support of the photographic stripping film is attained, by applying between both said membrane and said support a stripping layer, the binding agent of which mainly consists of polycondensates soluble in volatile organic solvents.

As polycondensates being soluble in volatile organic solvents, can be stated:

A. Soluble polyesters (a) Of at least one aliphatic dicarboxylic acid and at least one aliphatic diol such as polyesters of sebacic acid and ethylene glycol, (b) of at least one phthalic acid and at least one aliphatic diol, such as polyesters of orthophthalic acid and ethylene glycol, and polyesters of isophthalic acid and pentamethylene glycol, (c) of at least one aliphatic saturated dicarboxylic acid, at least one phthalic acid, and at least one aliphatic diol, such as polyesters of isophthalic acid, sebacic acid and ethylene glycol, (d) polybisphenol esters of at least one aliphatic and/or one aromatic dicarboxylic acid such as polyesters of adipic acid and 2,2-bis(4-hydroxy-3,5-dichlorophenyl)propane, polyesters of sebacic acid and 2,2-bis(4-hydroxyphenyl)propane, polyesters of isophthalic acid and 2,2-bis(4-hydroxyphenyl)butane and polyesters of isophthalic acid, terephthalic acid and 2,2-bis(4-hydroxyphenyl)propane.

A general survey of the linear polyesters is given by R. E. Wilfong, Polymer Sci., 54, 385–410 (1961), whereas soluble polyesters are described by W. H. Carothers and J. A. Arvin, J. Am. Chem. Soc., 51 (1929) 2560. Highly soluble polyesters of bisphenols are described by A. Conix, Ind. Eng. Chem., 51 (1959) 147.

B. Soluble polyamides

Particularly appropriate are the soluble copolyamides presenting an aperiodic chain structure, i.e., copolyamides originating from a polycondensation of more than two monomeric compounds. Suitable monomeric compounds are, e.g., dicarboxylic acids such as adipic acid and succinic acid, and diamines such as hexamethylenediamine and ethylenediamine.

A very interesting class is presented by the polyamides resulting from the condensation of unsaturated dimeric fatty acids (chiefly linolic acid) with different polyamines.

C. Soluble polyester amides

Examples are polyester amides of isophthalic acid, ethylene glycol and hexamethylenediamine, and polycondensates of carbonic acid, 2,2-bis(4-hydroxyphenyl)propane and hexamethylenediamine.

D. Soluble polysulphonates

Examples are described by A. Conix, Kurzmitteilungen des Symposiums über Makromoleküle, Wiesbaden, 12–17 October 1959, Sektion IV, Chemie organischer und anorganischer makromolekularer Stoffe, Vortrag IV B9.

E. Soluble polyester of the polycarbonate type

Examples are described by H. Schnell in Ang. Chemie, 68 (1956), 633.

F. Soluble isocyanate rubbers of polyester amides

Suitable examples are the reaction products of an aryl diisocyanate with a copolycondensate of adipic acid, ethylene glycol and ethanolamine.

A very interesting group is presented by the isocyanate rubbers prepared by conversion of the final grouping of linear polyesters containing amide groupings with a diisocyanate.

G. Soluble polyurethanes

Examples are described by E. L. Wittbecker and M. Katz, J. Polymer Sci., 40 (1959) 367.

Synthetic substances which are considered to be worked up into a sheet preferably having a thickness of approximately 50 to approximately 200 microns, which sheet can be utilized as a hydrophobic support in a material according to the present invention are i.e. polyesters such as a polyethylene terephthalate, polycarbonates, and polybisphenol esters of dicarboxylic acids and bisphenols. Excellent results are attained especially when utilizing a polyethylene terephthalate sheet as a hydrophobic support.

The mechanical properties of such hydrophobic supports made of plastics can be improved yet by stretching them in one or two directions.

Film-forming components suitable for the production of the hydrophobic flexible membrane of a stripping film according to the present invention are i.e. cellulose nitrate, cellulose triacetate, cellulose propionate, cellulose acetobutyrate, cellulose acetopropionate, cellulose diacetate, a mixture of ethylcellulose and cellulose nitrate, other single or mixed cellulose esters, polyamides, polycarbonates, polyesters, poly(vinyl chloride), poly(vinyl esters), and poly(vinyl acetals).

Further ingredients may be incorporated into the stripping layer, e.g., stabilizing agents, anti-oxidants, plasticizers such as triphenyl phosphate, tricresyl phosphate, dimethoxyethyl phthalate, dibutyl phthalate, tributyrin, butylphthalylbutyl glycolates, cyclohexyl phthalate and butyl Cellosolve stearate, plastics and resins such as copoly(vinyl chloride/vinyl acetate/maleic anhydride), copoly(vinyl acetate/vinyl stearate), and copoly(vinyl acetate/vinyl laurate), and rubbers such as chlorosulphonated polyethylene, polyamides, arylsulphonamide - formaldehyde resins and reaction products of polyamides and diisocyanates.

A stripping layer as used according to the present invention can be applied to the hydrophobic support from a solution of at least one polycondensate and of eventual additions in volatile organic solvents, usually chlorinated aliphatic hydrocarbons such as methylene chloride, 1,2-dichloroethane, and in mixtures of solvents such as acetone and ethyl acetate.

The hydrophobic flexible membrane is coated on the stripping layer. There may be only one, or more than one light-sensitive silver halide emulsion layer and such light-sensitive layer or layers are applied over the said membrane, e.g., after that membrane has first been coated with a subbing layer and, if desired, with one or more other intermediate layers.

Generally the adhesion caused by the stripping layer is proportional to its thickness. In order to attain a favourable adhesion for a stripping film according to the present invention, it is suitable for the thickness of the stripping layer to be such that 0.050 to 2 g., and preferably 0.5 to 1 g. of solid substance is present per sq. m. This thickness, however, can be considerably altered by the addition of products which increase or reduce the adhesive power. At the same time the thickness is strongly dependent on the nature of the solvent from which the stripping layer is cast.

During the production of the stripping film according to the present invention it has been found surprisingly that the drying conditions of the stripping layer appear to exert but little influence on the properties or the quality of this layer.

A stripping film according to the present invention manifests an excellent dimensional stability and an amply sufficient adhesion between the hydrophobic flexible membrane and the polyester support. This adhesion, however, is not too strong, so that the separation can occur at the right moment without involving any troubles. Obviously this invention only pertains to the hydrophobic support, the hydrophobic flexible membrane and the stripping layer sandwiched in between. The further composition of the stripping film can be of many kinds. For instance, if the stripping film is a photogravure film, a thin layer not capable of being tanned as described in United States patent application Ser. No. 250,028 now Patent No. 3,282,698 may be provided between the hydrophobic flexible membrane and the light-sensitive emulsion layer and in the hydrophobic flexible membrane may be present a plasticizer as described in United States patent application Ser. No. 66,316 now Patent No. 3,222,174.

The following examples illustrate the invention. All K-values of cellulose nitrate occurring in the next were determined according to the formula of H. Fikentscher, Cellulosechemie, volume XIII, 1932, p. 58.

EXAMPLE 1

A. *Disposition of the screen printing film, comprising successively the following layers*

(1) A hydrophobic flexible support of polyethylene terephthalate being 100μ thick.

(2) A stripping layer which is applied according to the reverse roll coating system pro rata of 1 l. per 32 sq. m. from the following solution:

| | | |
|---|---|---|
| Polyester of isophthalic acid and pentamethylene glycol | g | 5 |
| Methylene chloride | cc | 100 |
| 1,2-dichloroethane | cc | 550 |
| Methylglycol acetate | cc | 50 |
| Ethyl acetate | cc | 200 |

This layer is dried at 70° C.

(3) A hydrophobic flexible membrane which is applied according to the reverse roll coating system from the following solution:

| | | |
|---|---|---|
| Cellulose nitrate (K-value:15) | g | 5 |
| Diethyl ether | cc | 360 |
| Ethanol | cc | 590 |
| n-Butanol | cc | 50 |

This layer is applied in such a way that upon drying at 80° C. approximately 800 mg. of cellulose nitrate are present per sq. m.

(4) A subbing layer which is cast from the following composition pro rata of 1 liter per 50 sq. m.:

| | | |
|---|---|---|
| Gelatin | g | 10 |
| Water | cc | 40 |
| Acetic acid | cc | 4 |
| Methanol | cc | 960 |

(5) A light-sensitive emulsion layer, which is applied from the following dispersion in such an amount, that upon drying 14 g. of solid substance are present per sq. m.:

| | Cc. |
|---|---|
| Orthochromatic gelatin silver bromoiodide emulsion (1 mole percent of iodide) having an initial proportion of gelatin to silver nitrate of 4:1 and having a very high gradation | 100 |
| Water | 15 |
| 5% aqueous solution of the trisodium salt of 3-methyl - 4 - [2'-acetyl-3'-(5''-hydroxy-3''-methyl-1'''-p-sulphophenyl - 4''-pyrazolyl)-2'-propenylidene]-1-p-sulphophenyl-5-pyrazolone | 1 |
| 50% aqueous solution of urea | 3 |
| 5% aqueous solution of tetradecyl sodium sulphate | 1 |

(6) A light-sensitive emulsion layer is applied from the following dispersion in such a way that upon drying 4 g. of solid substance are present per sq. m.:

| | | |
|---|---|---|
| Orthochromatic emulsion as described above | cc | 20 |
| Water | cc | 73 |
| Gelatin | g | 3.2 |
| 5% aqueous solution of the trisodium salt of 3-methyl - 4 - [2'-acetyl-3'-(5''-hydroxy-3''-methyl-1'' - p - sulphophenyl-4''-pyrazolyl)-2'-propenylidene]-1-p-sulphophenyl-5-pyrazolone | cc | 1 |
| 50% aqueous solution of urea | cc | 2 |
| 5% aqueous solution of tetradecyl sodium sulphate | cc | 1 |

The resulting screen printing film comprises in the aggregate 18 g. of silver halide emulsion per sq. m.

B. *Production of the screen printing stencil*

The screen printing film described above is exposed through the back to a line diapositive and is then tanning-developed. The unexposed and consequently untanned areas of the light-sensitive emulsion layer are then washed away in warm water, thus leaving but the exposed areas. The image-wise tanned and washed resist is affixed with the emulsion side to the screen and dried. Subsequently the hydrophobic flexible polyethylene terephthalate support is removed by stripping. Up to now this support warrants an excellent dimensional stability. The hydrophobic support can be very easily stripped from the hydrophobic membrane at the exposed areas, where the hydrophobic flexible membrane is fixed to the hardened gelatin. At the unexposed areas, however, the thin hydrophobic membrane is not supported by tanned gelatin during the stripping of the hydrophobic support, so that it is tearing up and remains attached to the support. This way, a screen printing stencil is obtained, the unexposed areas of which are entirely open.

EXAMPLE 2

Example 1 is repeated, but the stripping layer is applied according to the reverse roll coating system pro rata of 1 liter per 40 sq. m. from the following solution:

| | |
|---|---|
| Polyester of sebacic acid and 2,2-bis(4-hydroxyphenyl)propane _____ g__ | 5 |
| Polyester of isophthalic acid and ethylene glycol _____ g__ | 0.1 |
| Methylene chloride _____ cc__ | 100 |
| 1,2-dichloroethane _____ cc__ | 700 |
| Ethyl acetate _____ cc__ | 150 |
| Methylglycol acetate _____ cc__ | 50 |

EXAMPLE 3

A. *Disposition of the photogravure film*

(1) A support of polyethylene terephthalate having a thickness of 100µ and provided at the back side with a common photographic subbing layer and antihalation layer. At the front side are applied successively:

(2) A stripping layer which is applied pro rata of 1 l. per 36 sq. m. according to the reverse roll coating system from the following solution:

| | |
|---|---|
| A polyamide resin having an amine-value of 290–320 milli-equivalents of KOH per g. of resin and a viscosity of 80–120 poises (Brookfield viscosimeter) at 40° C. _____ g__ | 5 |
| Ethylene chlorohydrine _____ cc__ | 50 |
| Isopropanol _____ cc__ | 50 |
| Toluene _____ cc__ | 450 |
| Methylene chloride _____ cc__ | 450 |

Drying temperature: 80° C.

(3) A hydrophobic flexible membrane applied from the following coating composition in such a way that upon drying 10 g. of solid substance are present per sq. m.:

| | |
|---|---|
| Cellulose nitrate (K-value: 30) _____ g__ | 40 |
| Tricresyl phosphate _____ g__ | 10 |
| Diethyl ether _____ cc__ | 200 |
| Ethanol _____ cc__ | 700 |
| n-Butanol _____ cc__ | 100 |

(4) A subbing layer which is applied pro rata of 1 liter per 45 sq. m. from the following coating composition:

| | |
|---|---|
| Gelatin _____ g__ | 2 |
| Water _____ cc__ | 17 |
| Acetic acid _____ cc__ | 1 |
| Methanol to _____ cc__ | 1000 |

(5) An orthochromatic gelatin silver chlorobromide emulsion layer, which is exempt of hardeners.

B. *Production of the etching resist*

The photogravure film is consecutively exposed through a continuous tone diapositive and through a gravure screen, tanning-developed, fixed, and rinsed. The emulsion side of the photogravure film is then placed in contact with the copper cylinder to be etched. During all these operations the polyester support warrants an effective dimensional stability. From the moment that the developed photogravure film is firmly attached to the copper cylinder, the polyester support is very easily eliminated by stripping. Subsequently the hydrophobic membrane is removed according to a process described in United States patent application Ser. No. 66,316 and the unexposed and consequently untanned parts are washed away, so that finally nothing remains on the copper cylinder but the etching resist.

EXAMPLE 4

Example 3 is repeated, but a stripping layer is applied according to the reverse roll coating system pro rata of 1 liter per 52 sq. m. from the following solution:

| | |
|---|---|
| Polyester amide of isophthalic acid, ethylene glycol and hexamethylenediamine _____ g__ | 3.5 |
| 1,2-dichloroethane _____ cc__ | 50 |
| Methylglycol _____ cc__ | 30 |
| Sym.-tetrachloroethane _____ cc__ | 20 |

EXAMPLE 5

Example 3 is repeated, but the stripping layer is applied from the following coating composition:

| | |
|---|---|
| Polycondensate of phosgene, 2,2-bis(4-hydroxyphenyl)propane and hexamethylenediamine _____ g__ | 2.5 |
| 1,2-dichloroethane _____ cc__ | 100 |

EXAMPLE 6

Example 3 is repeated, but the stripping layer is applied according to the reverse roll coating system pro rata of 1 liter per 40 sq. m. from the following solution:

| | |
|---|---|
| An acetone-soluble high-viscous conversion product of a diisocyanate with a polyester amide having a molecular weight of approximatively 5000 and which is obtained by condensation of a dibasic acid, a diglycol and a diamine _____ g__ | 30 |
| Methylene chloride _____ cc__ | 400 |
| 1,2-dichloroethane _____ cc__ | 200 |
| Benzene _____ cc__ | 300 |
| Ethylene chlorohydrine _____ cc__ | 100 |

The resulting layer is dried at 70° C.

We claim:

1. A photographic stripping film comprising successively a polyester support, a stripping layer containing as a binding agent a polycondensate which is soluble in volatile organic solvents and is selected from the group consisting of a polyamide, a polyesteramide and an isocyanate rubber of a polyesteramide, a hydrophobic, flexible self-supporting membrane of a cellulosic ester, and a light-sensitive layer strongly adhering to said membrane.

2. The stripping film of claim 1 wherein said light-sensitive layer is a silver halide emulsion layer.

3. The striping film of claim 2 wherein said light-sensitive layer is adhered to said membrane by means of a subbing layer.

4. The stripping film of claim 3 wherein said subbing layer contains gelatin as a binding agent.

5. The stripping film of claim 2 wherein the polyester of said support is polyethylene terephthalate.

6. The photographic stripping film of claim 2 wherein said polycondensate is the polyesteramide of isophthalic acid, ethylene glycol and hexamethylenediamine.

7. The stripping film of claim 2 wherein said self-supporting membrane is cellulose nitrate.

8. The stripping film of claim 2 wherein the thickness of said stripping layer equals 0.05–2 grams of solid weight per square meter of area.

9. The stripping film of claim 2 wherein said self-supporting membrane contains a plasticizing agent for said cellulosic ester.

10. A photographic stripping film according to claim 2, wherein said polycondensate is a copolyamide having an aperiodic chain structure.

11. A photographic stripping film according to claim 2, wherein said polycondensate is an isocyanate rubber of a polyesteramide.

References Cited

UNITED STATES PATENTS

| | | | |
|---|---|---|---|
| 2,328,034 | 8/1943 | Sease | 96—83 |
| 2,760,863 | 8/1956 | Plambeck | 96—115 |
| 3,043,695 | 7/1962 | Alles | 96—83 |
| 3,145,105 | 8/1964 | Lee | 96—87 |
| 3,178,287 | 4/1965 | Sweet et al. | 96—87 |
| 3,210,187 | 10/1965 | Thommes | 96—83 |

J. TRAVIS BROWN, *Primary Examiner.*

NORMAN G. TORCHIN, *Examiner.*

R. H. SMITH, *Assistant Examiner.*